(12) United States Patent
Paek et al.

(10) Patent No.: US 7,885,817 B2
(45) Date of Patent: Feb. 8, 2011

(54) EASY GENERATION AND AUTOMATIC TRAINING OF SPOKEN DIALOG SYSTEMS USING TEXT-TO-SPEECH

(75) Inventors: Timothy S. Paek, Sammamish, WA (US); David M. Chickering, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1238 days.

(21) Appl. No.: 11/170,584

(22) Filed: Jun. 29, 2005

(65) Prior Publication Data

US 2006/0206332 A1   Sep. 14, 2006

Related U.S. Application Data

(60) Provisional application No. 60/659,689, filed on Mar. 8, 2005.

(51) Int. Cl.
*G10L 21/00* (2006.01)

(52) U.S. Cl. ........................... 704/270; 704/275

(58) Field of Classification Search ........... 704/270, 704/275
See application file for complete search history.

(56) References Cited

U.S. PATENT DOCUMENTS

| | | | |
|---|---|---|---|
| 4,228,496 A | 10/1980 | Katzman et al. | |
| 4,769,771 A | 9/1988 | Lippmann et al. | |
| 5,165,018 A | 11/1992 | Simor | |
| 5,274,821 A | 12/1993 | Rouquie | |
| 5,428,792 A | 6/1995 | Conner et al. | |
| 5,428,803 A | 6/1995 | Chen et al. | |
| 5,452,447 A | 9/1995 | Nelson et al. | |
| 5,493,692 A | 2/1996 | Theimer et al. | |
| 5,544,321 A | 8/1996 | Theimer et al. | |

(Continued)

FOREIGN PATENT DOCUMENTS

EP   0713257 A1   5/1996

(Continued)

OTHER PUBLICATIONS

Chung, "Developing a flexible spoken dialog system using simulation", Annual Meeting of the ACL Proceedings of the 42nd Annual Meeting on Association for Computational Linguistics, Published in 2004.*

(Continued)

*Primary Examiner*—James S Wozniak
*Assistant Examiner*—Jialong He
(74) *Attorney, Agent, or Firm*—Lee & Hayes, PLLC

(57) ABSTRACT

A dialog system training environment and method using text-to-speech (TTS) are provided. The only knowledge a designer requires is a simple specification of when the dialog system has failed or succeeded, and for any state of the dialog, a list of the possible actions the system can take.

The training environment simulates a user using TTS varied at adjustable levels, a dialog action model of a dialog system responds to the produced utterance by trying out all possible actions until it has failed or succeeded. From the data accumulated in the training environment it is possible for the dialog action model to learn which states to go to when it observes the appropriate speech and dialog features so as to increase the likelihood of success. The data can also be used to improve the speech model.

18 Claims, 6 Drawing Sheets

U.S. PATENT DOCUMENTS

| | | | |
|---|---|---|---|
| 5,555,376 A | 9/1996 | Theimer et al. | |
| 5,566,302 A | 10/1996 | Khalidi et al. | |
| 5,577,251 A | 11/1996 | Hamilton et al. | |
| 5,603,054 A | 2/1997 | Theimer et al. | |
| 5,611,050 A | 3/1997 | Theimer et al. | |
| 5,621,809 A | 4/1997 | Bellegarda et al. | |
| 5,664,173 A | 9/1997 | Fast | |
| 5,732,274 A | 3/1998 | O'Neill | |
| 5,787,251 A | 7/1998 | Hamilton et al. | |
| 5,806,060 A | 9/1998 | Borgida et al. | |
| 5,812,865 A | 9/1998 | Theimer et al. | |
| 5,826,269 A | 10/1998 | Hussey | |
| 5,860,064 A * | 1/1999 | Henton | 704/260 |
| 5,864,810 A | 1/1999 | Digalakis et al. | |
| 5,899,997 A | 5/1999 | Ellacott | |
| 5,950,196 A | 9/1999 | Pyreddy et al. | |
| 5,961,582 A | 10/1999 | Gaines | |
| 5,991,754 A | 11/1999 | Raitto et al. | |
| 5,995,959 A | 11/1999 | Friedman et al. | |
| 6,032,144 A | 2/2000 | Srivastava et al. | |
| 6,128,612 A | 10/2000 | Brereton et al. | |
| 6,144,999 A | 11/2000 | Khalidi et al. | |
| 6,163,856 A | 12/2000 | Dion et al. | |
| 6,173,266 B1 * | 1/2001 | Marx et al. | 704/270 |
| 6,182,061 B1 | 1/2001 | Matsuzawa et al. | |
| 6,253,181 B1 | 6/2001 | Junqua | |
| 6,321,198 B1 * | 11/2001 | Hank et al. | 704/270 |
| 6,389,393 B1 | 5/2002 | Gong | |
| 6,466,232 B1 | 10/2002 | Newell et al. | |
| 6,510,411 B1 * | 1/2003 | Norton et al. | 704/254 |
| 6,513,046 B1 | 1/2003 | Abbott, III et al. | |
| 6,516,322 B1 | 2/2003 | Meredith | |
| 6,523,026 B1 | 2/2003 | Gillis | |
| 6,523,027 B1 | 2/2003 | Underwood | |
| 6,549,915 B2 | 4/2003 | Abbott, III et al. | |
| 6,556,960 B1 | 4/2003 | Bishop et al. | |
| 6,584,459 B1 | 6/2003 | Chang et al. | |
| 6,598,169 B1 | 7/2003 | Warwick et al. | |
| 6,615,322 B2 | 9/2003 | Arimilli et al. | |
| 6,622,121 B1 * | 9/2003 | Crepy et al. | 704/243 |
| 6,654,734 B1 | 11/2003 | Mani et al. | |
| 6,691,148 B1 | 2/2004 | Zinky et al. | |
| 6,747,675 B1 | 6/2004 | Abbott et al. | |
| 6,766,330 B1 | 7/2004 | Chen et al. | |
| 6,766,348 B1 | 7/2004 | Combs et al. | |
| 6,791,580 B1 | 9/2004 | Abbott et al. | |
| 6,799,162 B1 | 9/2004 | Goronzy et al. | |
| 6,801,223 B1 | 10/2004 | Abbott et al. | |
| 6,812,937 B1 | 11/2004 | Abbott et al. | |
| 6,826,555 B2 | 11/2004 | Nunez | |
| 6,826,562 B1 | 11/2004 | Leung et al. | |
| 6,842,877 B2 | 1/2005 | Robarts et al. | |
| 6,845,507 B2 | 1/2005 | Kenton | |
| 6,910,068 B2 | 6/2005 | Zintel et al. | |
| 6,912,529 B1 | 6/2005 | Kolfman | |
| 6,944,184 B1 | 9/2005 | Miller et al. | |
| 6,950,821 B2 | 9/2005 | Faybishenko et al. | |
| 7,016,842 B2 * | 3/2006 | Mills | 704/270 |
| 7,024,348 B1 * | 4/2006 | Scholz et al. | 703/24 |
| 7,055,142 B2 | 5/2006 | Meredith et al. | |
| 7,089,294 B1 | 8/2006 | Baskey et al. | |
| 7,117,487 B2 | 10/2006 | Meredith et al. | |
| 7,143,167 B2 | 11/2006 | Kampe et al. | |
| 7,292,976 B1 * | 11/2007 | Hakkani-Tur et al. | 704/236 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0143944 A1 | 10/2002 | Traversat et al. | |
| 2002/0147771 A1 | 10/2002 | Traversat et al. | |
| 2002/0169852 A1 | 11/2002 | Schaeck | |
| 2002/0184070 A1 | 12/2002 | Chen et al. | |
| 2003/0018694 A1 | 1/2003 | Chen et al. | |
| 2003/0046401 A1 | 3/2003 | Abbott et al. | |
| 2003/0058277 A1 | 3/2003 | Bowman-Amuah | |
| 2003/0126136 A1 | 7/2003 | Omoigui | |
| 2003/0154476 A1 | 8/2003 | Abbott, III et al. | |
| 2003/0163316 A1 * | 8/2003 | Addison et al. | 704/260 |
| 2003/0163461 A1 | 8/2003 | Gudbjartsson et al. | |
| 2003/0212540 A1 | 11/2003 | Meredith et al. | |
| 2003/0212671 A1 | 11/2003 | Meredith et al. | |
| 2003/0212672 A1 | 11/2003 | Meredith et al. | |
| 2003/0212761 A1 | 11/2003 | Meredith et al. | |
| 2004/0148363 A1 | 7/2004 | Hadi | |
| 2004/0181390 A1 | 9/2004 | Manson | |
| 2005/0033582 A1 * | 2/2005 | Gadd et al. | 704/277 |
| 2005/0034078 A1 | 2/2005 | Abbott et al. | |
| 2005/0125232 A1 | 6/2005 | Gadd | |
| 2005/0216264 A1 * | 9/2005 | Attwater et al. | 704/239 |
| 2006/0058999 A1 | 3/2006 | Barker et al. | |
| 2006/0085187 A1 * | 4/2006 | Barquilla | 704/243 |
| 2006/0195321 A1 | 8/2006 | Deligne et al. | |
| 2008/0059188 A1 * | 3/2008 | Konopka et al. | 704/257 |

FOREIGN PATENT DOCUMENTS

| | | |
|---|---|---|
| WO | 9800787 | 1/1998 |

OTHER PUBLICATIONS

U.S. Appl. No. 11/170,998, filed Jun. 29, 2005, Paek, et al.
U.S. Appl. No. 11/170,999, filed Jun. 29, 2005, Paek, et al.
U.S. Appl. No. 11/169,503, filed Jun. 29, 2005, Chichering, et al.
Lee, Wayne. "Decision Theory and Human Behavior." (1971) John Wiley & Sons, Inc. New York.
Boutilier, C., Dean T., and Hanks, S. "Decision-theoretic Planning: Structural Assupmtions and Computatonal Leverage." Journal of Artificial Intelligence Research, (1999). pp. 1-93, vol. 1:1.
Cooper, G. F. "A Method for Using Belief Networks as Influence Diagrams." Proceedings of the Ninth Conference on Uncertainty in Artificial Intelligence, Washington, D.C. (1993). pp. 55-63.
Dearden, R., Friedman, N., and Russell, S. "Bayesian Q-learning." Proceedings of the Fifteenth National Conference on Artificial Intelligence, (1998). pp. 761-768.
Heckerman, D. "A Bayesian Approach for Learning Casual Networks." Proceddings of the Eleventh Conference on Uncertainity in Artificial Intelligence, Montreal. (1995).
Heckerman, D. "A Tutorial on Learning Bayesian Networks." Technical Report MSR-TR-95-06, Microsoft Research, Mar. 1995 (Revised Nov. 1996).
Kaelbling, L. P., Littman, M. L. and Morre, A. W. "Reinforcment Learning: A survey." Journal of Articial Intelligence Research, (1996). pp. 237-285, vol. 4.
Lauritzen, S. L. and Nilsson, D. "Representing and Solving Decisions Problems with Limited Information." Management Science, (2001). pp. 1235-1251, vol. 47.
Singh, S., Litman, D., Kearns, M., and Walker, M. "Optimizing Dialogue Managemant with Reinforcement Learning: Experiments with the nj-fun System." Journal of Artificial Intelligence Research, (2002). pp. 105-133. vol. 16.

Tatman, J. A. and Shachter, R.D. "Dynamic Programming and Influence Diagrams." IEEE Transactions on Sysytems, Man and Cybernetics, (1990). pp. 365-379. vol. 20.
Thompson, W. R. "On The Liklihood That One Unknown Probability Exceeds Another In View of the Evidence of Two Samples." Biometricka, (1933). pp. 285-294.
Wyatt, J. PhD thesis, University of Edinburgh. "Exploration and Inference in Learning from Reinforcement." (1997).
Young, S. "Problilistic Methods in Spoken Dialogue Systems." Philosophical Transactions of the Royal Society (Series A), (2000). pp. 1389-1402.
Thompson, William A. "On the Theory of Apportionment." American Journal of Math, (1935). pp. 450-456.
Marilyn Walker, "An Application of Reinforcement Learning to Dialogue Strategy Selection in a Spoken Dialogue System for Email", pp. 387-416, 2000.
Matthew Stone, "Foundations of Language Interaction", pp. 1-4, 2001.
Tim Paek, et al., "On the Utility of Decision-Theoretic Hidden Subdialog", 2003.
Eric Horvitz, et al., "Harnessing Models of Users' Goals to Mediate Clarification Dialog in Spoken Language Systems", 2001.
Satinder Singh, et al., "Reinforcement Learning for Spoken Dialogue Systems", 2000.
T. Joachims, Text categorization with support vector machines: learning with many relevant features, Machine Learning, European Conference on Machine Learning, Apr. 21, 1998, pp. 137-142.
International Search Report dated Sep. 29, 2003 for PCT Application Serial No. 00/20685, 3 Pages.
U.S. Appl. No. 11/170,584, filed Jun. 29, 2005, Paek, et al.
U.S. Appl. No. 11/169,503, filed Jun. 29, 2005, Chickering, et al.
Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, In Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38 - No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In The 14th International Conference on Distributed Computing Systems, Jun. 1994, pp. 29-38.
Mike Spreitzer et al., Scalable, Secure, Mobile Computing with Location Information, Communications of the ACM, Jul. 1993, 1 page, vol. 36 - No. 7.
Roy Want, et al., The Active Badge Location System, ACM Transactions on Information Systems, Jan. 1992, pp. 91-102, vol. 10 - No. 1.
Mark Weiser, Some Computer Science Issues in Ubiquitous Computing, Communications of the ACM, Jul. 1993, pp. 75-84, vol. 36 - No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of The First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, et al., Disseminationg Active Map Information to Mobile Hosts, IEEE Network, 1994, pp. 22-32, vol. 8 - No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May 1998, 48 pages.
Mark Weiser, The Computer for the 21st Century, Scientific American, Sep. 1991, 8 pages.
Cooper, G. F. "A method for using belief networks as influence diagrams." Proceedings of the Ninth Conference on Uncertainty in Artificial Intelligence, Washington, D.C. (1993). pp. 55-63.
Heckerman, D. "A tutorial on learning Bayesian networks." Technical Report MSR-TR-95-06, Microsoft Research, Mar. 1995 (Revised Nov. 1996).
Kaelbling, L. P., Littman, M. L. and Morre, A. W. "Reinforcment learning: A survey." Journal of Articial Intelligence Research, (1996). pp. 237-285, vol. 4.
Lauritzen, S. L. and Nilsson, D. "Representing and solving decisions problems with limited information."Management Science, (2001). pp. 1235-1251, vol. 47.
Singh, S., Litman, D., Kearns, M., and Walker, M. "Optimizing Dialogue managemant with reinforcement learning: Experiements with the nj-fun system." Journal of Artificial Intelligence Research, (2002). pp. 105-133. vol. 16.
Tatman, J. A. and Shachter, R.D. "Dynamic programming and influence diagrams." IEEE Transactions on Sysytems, Man and Cybernetics, (1990). pp. 365-379. vol. 20.
Wyatt, J. PhD thesis, University of Edinburgh. Exploration and Inference in Learning from Reinforcement, (1997).
Thompson, W. R. "On the theory of apportionment." American Journal of Math, (1935). vol. 57, pp. 285-294.
OA Dated Feb. 11, 2009 for U.S. Appl. No. 11/170,998, 57 pages.
OA Dated Feb. 19, 2009 for U.S. Appl. No. 11/170,999, 42 pages.
OA Dated Oct. 28, 2008 for U.S. Appl. No. 11/169,503, 11 pages.
OA Dated Jan. 9, 2009 for U.S. Appl. No. 11/169,503, 14 pages.
Abramsky, "Computational Interpretations of Linear Logic" Theoretical Computer Science 111(1-2). 1993. 53 pages.
Berger, et al., "Sequentiality and the pi.-Calculus" Abramsky, S. (ed.) Proceedings: Typed Lambda Calculi and Applications, 5th Int'l Conference. Krakow, Poland. May 2-5, 2001. 56 pages.
Bray, et al., "Extensible Markup Language (XML) 1.0 (Second Edition)" Oct. 6, 2000. <http://www.w3.org/TR/20000/REC-xml-20001006.html>. 50 pages.
Chaudhuri, et al., "A Robust, Optimization-Based Approach for Approximate Answering of Agregate Queries", ACM. May 2001. 12 pages.
Cleaveland, et al., "An Operational Framework for Value-Passing Processes" Feb. 1994, Proceedings of the 21st ACM SIGPLAN-SIGACT symposium on Principles of programming languages, p. 326-338.
Feijs, "Modeling Microsoft COM Using pi.-Calculus", Lecture Notes in Computer Science, vol. 1709. 1999. pp. 1343-1363. 31 pages.
Fournet, et al., "A Calculus of Mobile Agents" 1996. <http://citeseer.ist.psu.edu/fournet96calculus.html>. Last accessed Sep. 7, 2007. 16 pages.
Fournet, et al., "The join calculus: a language for distributed mobile programming" Sep. 2000. <http://citeseer.ist.psu.edu/432452.html>, Last accessed Sep. 7, 2007. 36 pages.

Haas, et al., "Extensible Query Processing in Starburst" ACM. Jun. 1989. 12 pages.

Honda, et al., "A Uniform Type Structure for Secure Information Flow", Jan. 2002 ACM SIGPLAN Notices, Proceedings of the 29th ACM SIGPLAN-SIGACT symposium on Principles of programming languages POPL '02. vol. 37 Issue 1.

Lee, et al., "On Modeling Real-time Mobile Processes", Jan. 2002, Australian Computer Science Commuications, Proceedings of the twenty-fifth Australiasian conference on Computer science—vol. 4 CRPITS '02, vol. 24 Issue 1, p. 139-147.

Mehta, "BizTalk Server 2000 Business Process Orchestration" 2001. <http://sites.computer.org/debull/AO1mar/mehta.ps.> Last accessed Sep. 7, 2007. 6 pages.

Microsoft, "What's New in the Apr. 2001 Microsoft XML Parser 4.0 Technology Preview" Apr. 2001. <http://msdn.microsoft.com/archive>. 3 pages.

Milner, "The Polyadic pi.-Calculus: A Tutorial" Proceedings: Int'l Summer School on Logic Algebra of Specification. Marktoberdorf, Germany. 1992. 50 pages.

Mohr, "Introduction to BizTalk Server 2000", 2000. <http://www.topxml.com/conference/wrox/2000_vegas/text/stephen_biztalk.pdf>. Last accessed Sep. 7, 2007. 10 pages.

Parson "Using Java Reflection to Automate Extension Language Parsing" IEEE. Dec. 1999. 14 pages.

Pericas-Geertsen, "XML-Fluent Mobile Agents" Dec. 2001. <http://citeseer.ist.psu.edu/pericas-geertsen99xmlfluent.html>. Last accessed Sep. 7, 2007. 90 pages.

Riely, et al., "A Typed Language for Distributed Mobile Processes (Extended abstract)", Jan. 1998 Proceedings of the 25th ACM SIGPLAN-SIGACT symposium on Principles of programming languages. p. 378-390.

Thatte, "XLANG, Web Services for Business Process Design" 2001. http://web.archive.org/web/20020207122217/ http://www.gotdotnet.com/team/xmlwsspecs/xlang-c/default.htm. Last accessed Sep. 2, 2008. 35 pages.

Uramoto, et al., "Composition of Web Services Based on Their Behavioral Descriptions" Journal of the Japanese Society for Artificial Intelligence, vol. 17, No. 4. The Japanese Society for Artificial Intelegence, Japan. Jul. 1, 2002. 10 pages.

Yoshida, et al. "Strong Normalisation in the pi.-Calculus". MCS Technical Report, Sep. 2001. Mar.201. 22 pages.

Japanese Office Action dated Sep. 9, 2008 for Japanese Patent Application Serial No. 2004-504130, 12 Pages.

U.S. Appl. No. 11/169,503, filed Jun. 29, 2005, Chickering, et al., "Action selection for reinforcement learning using influence diagrams".

U.S. Appl. No. 11/170,999, filed Jun. 29, 2005, Paek, et al., "Online learning for dialog systems".

Emmerich et al, "Implementing Incremental Code Migration with XML", ACM Press, Proc. 22nd Int. Conf. on Software Engineering, Jun. 2000, 10 pages.

Rasche, et al. "Configurable Services for Mobile Users", Proc. Seventh IEEE International Workshop on Object-Oriented Real-Time Dependable Systems, Aug. 2002, 8 pages.

Robert M. Losee, Jr., Minimizing information overload: the ranking of electronic messages, Journal of Information Science 15, Elsevier Science Publishers B.V., 1989, pp. 179-189.

* cited by examiner

EASY GENERATION AND AUTOMATIC TRAINING OF SPOKEN DIALOG SYSTEMS USING TEXT-TO-SPEECH

REFERENCE TO RELATED APPLICATIONS

This application claims the benefit of U.S. Provisional Application Ser. No. 60/659,689 filed on Mar. 8, 2005, and entitled SYSTEMS AND METHODS THAT FACILITATE ONLINE LEARNING FOR DIALOG SYSTEMS, the entirety of which is incorporated herein by reference.

BACKGROUND

Human-computer dialog is an interactive process where a computer system attempts to collect information from a user and respond appropriately. Spoken dialog systems are important for a number of reasons. First, these systems can save companies money by mitigating the need to hire people to answer phone calls. For example, a travel agency can set up a dialog system to determine the specifics of a customer's desired trip, without the need for a human to collect that information. Second, spoken dialog systems can serve as an important interface to software systems where hands-on interaction is either not feasible (e.g., due to a physical disability) and/or less convenient than voice.

Unfortunately, building dialog systems is typically a labor and knowledge intensive task, where complicated rules are hand-constructed for particular domains. To build a system, designers generally need at least programming skills and experience working with a speech recognition interface.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A dialog system training environment and method are provided. The dialog system can be employed to recognize spoken dialog using a particular speech application, for example, a voice-enabled browser. An utterance produced by a speaker can either be accepted as understood, and consequently the corresponding action is taken, or the utterance can be deemed ambiguous and in need of clarification. When the system does not understand an utterance, the system can initiate a repair dialogue.

In the training environment, the dialog system comprises two models: first, a speech model that takes as input raw voice signals, and outputs speech features. Typically the speech model also takes a grammar as input, where the grammar determines the types of recognitions that the speech model can make. For example, a speech model for recognizing city names can take raw voice signals as input, and output a list of cities that the user might have said, along with (for example) a corresponding set of confidences or probabilities. There are many other output features from the speech model.

The second model of the dialog system is the dialog action model. Those familiar with the art may also refer to this as the dialog management component. This model takes as input the speech features output by the speech model, and outputs an action for the application to take. For the voice-enabled browser example, based on the speech features, the dialog action model can determine that the application should request that the user repeat the last command.

In the training environment, the dialog action model can be trained automatically using various text-to-speech (TTS) engines as the speaker or simulated user. The only knowledge a designer requires is a simple specification of a dialog flow of the application. The dialog flow can be represented in various representational schemes, such as a finite state automata, a flow chart and the like. The only requirements for the dialog flow that is required by the environment is a list of all the actions that can be taken in particular states, and among the states that terminate the dialog, which ones are desirable or undesirable (or alternatively, the degree to which those states are desirable or undesirable), that is, a way of determining when the dialog system has failed or succeeded (or alternatively, determining the degree to which the system gas failed or succeeded).

This is much simpler than conventional system(s) which generally require application designers to express complicated rules combining various kinds of features, such as those related to the repair dialog at hand or the quality of recognition results received from the speech engine. Thus, human construction of complicated rules that combine speech and dialog features can be circumvented through the generation of a base parametric dialog action model (e.g., statistical model with learnable parameters) that can be trained for the task automatically by using data generated from a simulated user that explores substantially all routes in the dialog flow specification.

Instead of requiring designers to come up with complicated rules that combine speech and dialog features, designer(s) specify a dialog control flow with minimal requirements. For example, (1) what states of the repair dialog can be reached from what other states and (2) which of these states are failures and which are successes (or alternatively, to what degree are these states failures or successes). The designer does not have to specify the logic for when one state should transition to another state. The dialog system, in essence, learns which states to go to when it observes the appropriate speech and dialog features by trying out all repair paths using the user simulator (e.g., a "simulated user") where the user's voice is generated using various TTS engines varied at adjustable levels (e.g., pitch, rate, volume), for example, via a speech generator and learning an underlying parametric speech model.

The dialog action model can be trained such that it can be easily adaptable to many different voice and noise level scenarios. To simulate different voices, the user simulator can use several Text-To-Speech (TTS) voices to dictate commands, and can vary parameters of these voices such as pitch, rate, and volume. Additionally, to simulate different noisy environments, the user simulator can add to the utterance various levels and types of noise (e.g., crowd chatter and/or computer fans). From the data accumulated in the training environment, the dialog action model can learn which states to go to when it observes the appropriate speech and dialog features so as to increase the likelihood of success.

Optionally, the speech model can also be trained in the simulated environment. When the speech model is trained in the simulation environment, the speech model gets better at recognizing a particular voice.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject

DETAILED DESCRIPTION

Figure 1:
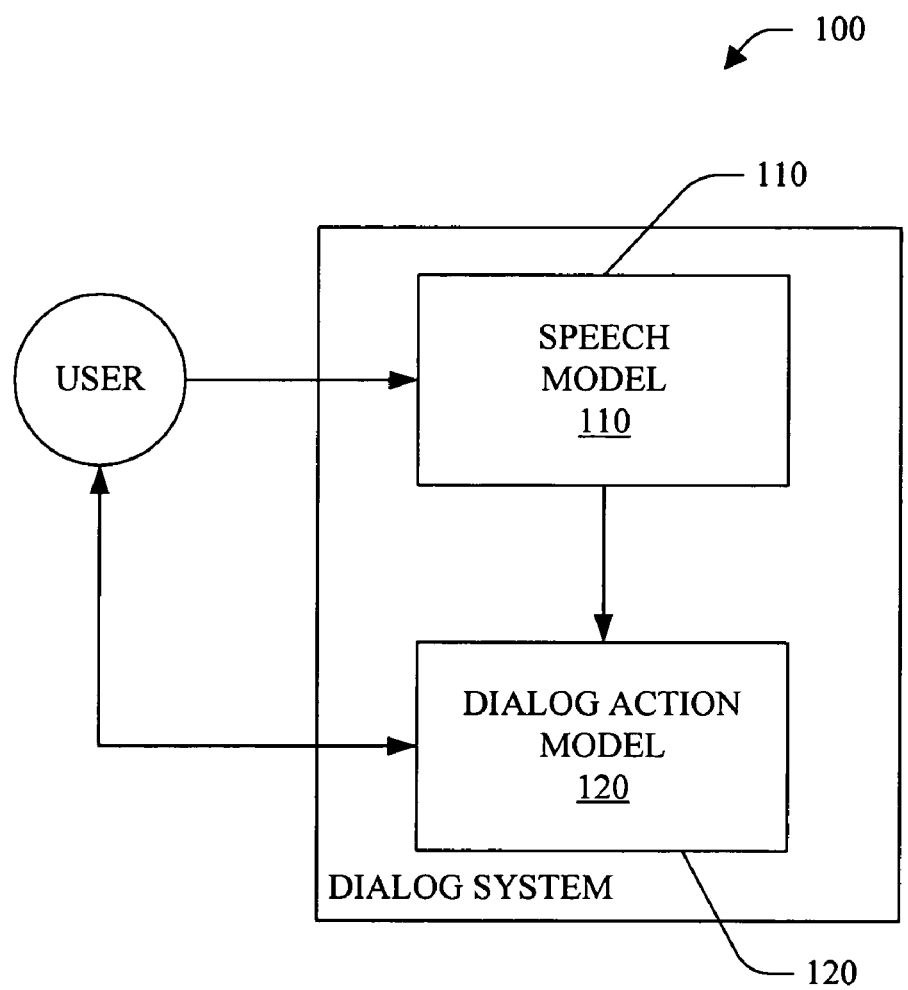
FIG. 1 is a block diagram of a dialog system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Referring to FIG. 1, a dialog system 100 is illustrated. The dialog system 100 includes a speech model 110 that takes as input raw voice signals, and outputs speech features. Typically the speech model 110 also takes a grammar as input, where the grammar determines the types of recognitions that the speech model can make. For example, a speech model 110 for recognizing city names can take raw voice signals as input, and output a list of cities that the user might have said, along with (for example) a corresponding set of confidences or probabilities. There are many other output features from the speech model 110.

The dialog system 100 further includes a dialog action model 120. This model takes as input the speech features output by the speech model, and outputs an action for the application to take. For the voice-enabled browser example, based on the speech features, the dialog action model 120 can determine that the application should request that the user repeat the last command.

In one example, an influence diagram can be a natural dialog action model 120 choice for a number of reasons. First, because users are not only likely to put up with long dialogs, the interaction was naturally finite and very short in length. Second, the nature of the interaction at each time step varied significantly. In particular, both the variables for predicting success and the overall behavior of the reward function were different in each step. Third, important relationships among variables that were not Markovian can be found. Finally, for repair dialogs in general, the set of actions that are appropriate at each time step may be varied.

Figure 2:
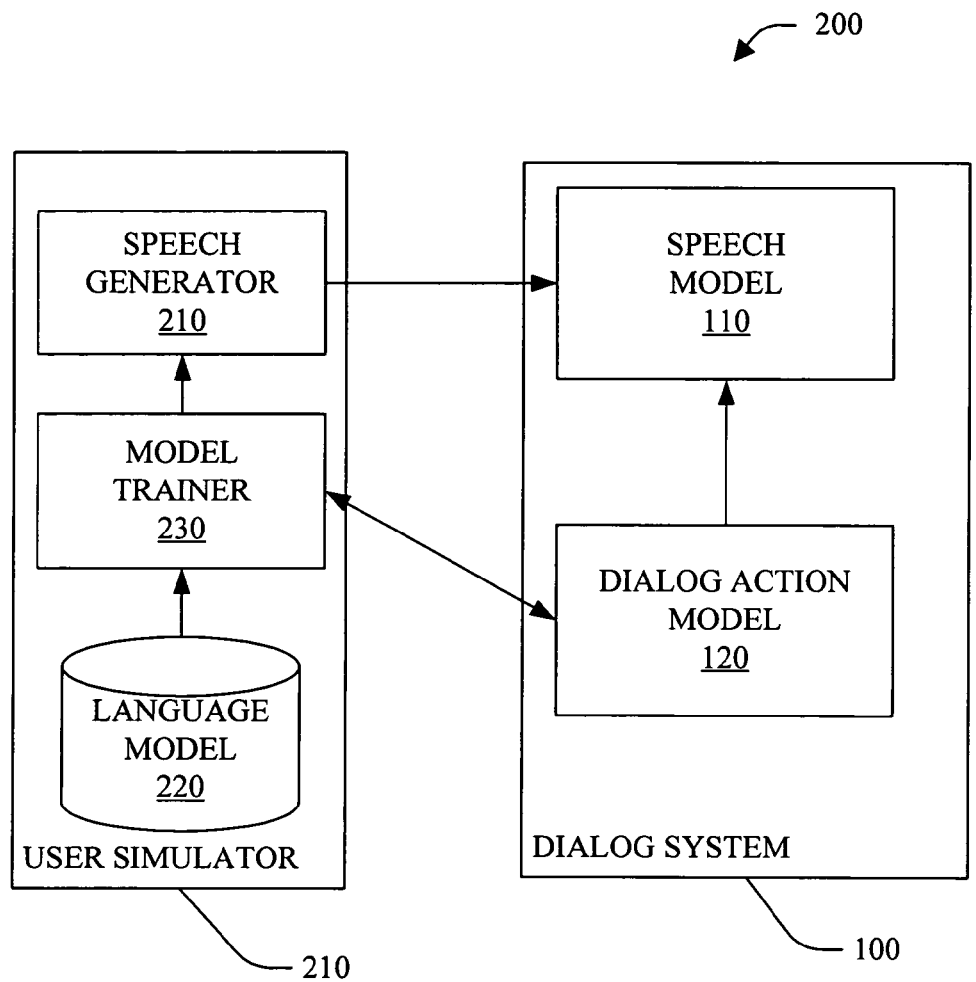
FIG. 2 is a block diagram of a dialog system training environment.

Next, referring next to FIG. 2, a dialog system training environment 200 is illustrated. In this example, a dialog model 120 of a dialog system 100 can be trained automatically using text-to-speech (TTS). Optionally, a speech model 110 of the dialog system 100 can be trained automatically using TTS.

In the training environment 200, the only knowledge a designer requires is a simple specification of when the system 100 has failed or succeeded (or alternatively, a degree of success/failure), and for any state of the dialog, a list of all the possible actions the system 100 can take. This is much simpler than conventional system(s) which generally require designers to express complicated rules regarding the quality of recognition results received from the speech engine.

Thus, in this example, human construction of complicated rules that combine speech and dialog features can be circumvented through the generation of a dialog system 100 (e.g., statistical models with learnable parameters) that can be trained for the task automatically by using data generated from a user simulator 210 that explores substantially all routes in the dialog flow specification.

Instead of requiring designers to come up with complicated rules that combine speech and dialog features, designer(s) specify a dialog control flow with minimal requirements. For example, (1) what states can be reached from what other states and (2) which of these states are failures and which are successes (or alternatively, to what degree are these states failures or successes). Notice that the designer does not have to specify the logic for when one state should transition to another state. The dialog system 100, in essence, learns which states to go to when it observes the appropriate speech and dialog features by trying out all paths using the user simulator 210 (e.g., a "simulated user") where the user's voice is generated using TTS varied at adjustable levels (e.g., pitch, rate, volume), for example, via a speech generator 240 and learning an underlying parametric speech model 110. From the data accumulated in the training environment 200, the dialog action model 120 can learn which states to go to when it observes the appropriate speech and dialog features so as to increase the likelihood of success.

In this example, a goal is to train the dialog action model 120 such that it can be easily adaptable to many different voice and noise level scenarios. To simulate different voices, the user simulator 210 can use several Text-To-Speech (TTS) voices to dictate commands, and can vary parameters of these voices such as pitch, rate, and volume. Additionally, to simulate different noisy environments, the user simulator 210 can add to the command utterance various levels and types of noise (e.g., crowd chatter and/or computer fans) to utterances.

A supervised-learning approach can be employed to construct the baseline speech model 110. In one example, approximately 20,000 dialogue sessions were generated. The following discussion regarding these generated sessions is provided for purposes of explanation and is not intended to limit the subject matter claimed herein.

In this example, a command was chosen uniformly at random by a model trainer 230 from the set of over 34 commands that were allowed by the browser applications (e.g., since some of these commands included numbers which had to be generated randomly such as "go to link 24") provided in a language model 220. Thereafter, the speech generator 240 was employed to generate the command using TTS voice at random, sampling from the allowed space of pitch, rate, and volume.

Next, the audio signal was picked up by a nearby microphone and was processed by SAPI (i.e. the speech model). In this example, additional variables that are functions of the SAPI variables (i.e., the output features of the speech model 110) were computed (e.g., Top Rules Match (3), described earlier). In total, between 50 to over 150 different values were recorded depending on how many steps the dialogue contained. In the training environment 200, the dialog action model 120 chose an action at random to perform (e.g., the dialog action model 120 did not select action based upon speech event(s) received from the speech model 110 as in normal (non-training) operation).

If the action was either Repeat or Confirm, the training environment 200 proceeded to the next time step, and had the user simulator 210 dictated the appropriate utterance in the same voice (e.g., in the case of a confirmation, the voice would dictate the appropriate integer). If the action was a DoTop or an Ignore, the model trainer 230 recorded whether or not the dialog system 100 correctly interpreted the command.

Figure 3:
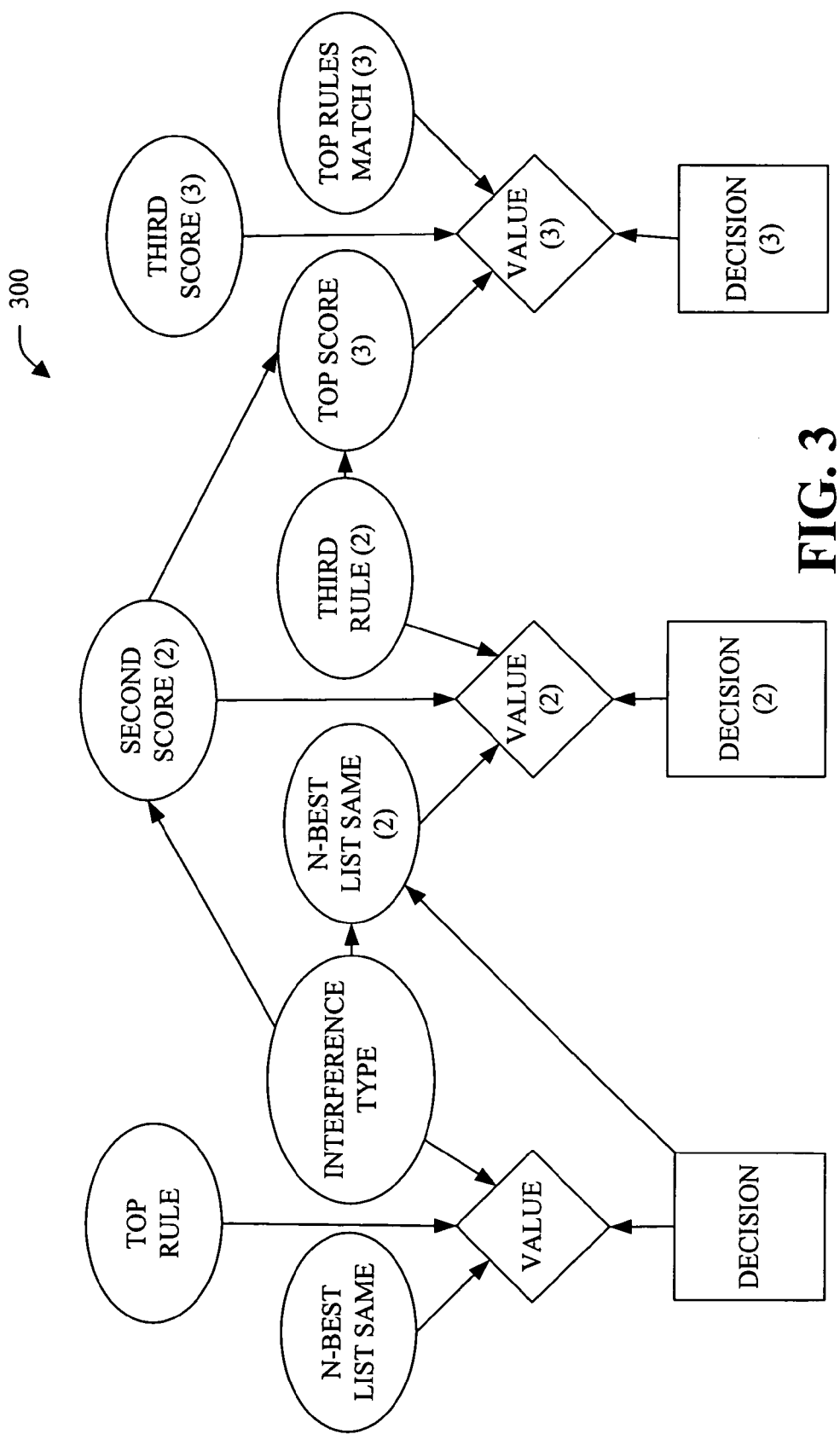
FIG. 3 is an influence diagram.

Continuing with this example, given this large set of data, a supervised learning algorithm was applied to learn the structure and parameters of the three-step influence diagram for the dialog action model 120. In particular, a decision tree for predicting immediate success or failure, at each time step, as a result of performing a DoTop or—in the case of the first time step—and Ignore was first learned. In this example, the allowed prediction variables were restricted to be chance nodes that are observed in the same time step. The resulting decision trees constitute the structure of the conditional probability of each value node: the expected value for a DoTop or Ignore is simply the probability of success times 100 plus the probability of failure times −100; in the case of a Repeat or Confirm action, the value is deterministic and equal to the user-specified value of a repair action. Once the variables that were predictive of success in each time step were identified, all other variables were eliminated from consideration and then learned a Bayesian network among all the chance variables, using the restriction that the resulting model be Markov (e.g., the parents of any chance node must be in either the same time step or the previous time step), the previous decision node was allowed to be a parent of any chance node. In this example, the dialog system 100 did not learn any structure among the chance variables in the first time step, as these variables are observed. The influence diagram depicted in FIG. 3 is representative of a subset of the model constructed using this process.

With regard to the environment 200, by trying out the utterances users can say via TTS and then attempting to respond to itself, dialog designers can allow the system 100 to automatically train itself and learn the kinds of complicated rules that are conventionally hand-crafted and tuned by humans. This tremendously simplifies the entire process of constructing and training spoken dialog systems.

For example, if the first state of the dialog is to start off with a prompt such as "What would you like to do?", the dialog system 100 can notice that from here the system 100 can say "Can you repeat that?" or "I'll do that (most likely guess) for you". In the training environment 300, the dialog system 100 can try out both and see which works better under what conditions. The system 100 is able to know what works better because the system 100 learns by talking to itself using TTS via the user simulator 210.

For example, first, the user simulator 210 can randomly choose what it should say from a list of all possible things the user can say stored in the language model 220. After the user simulator 210 decides what it will say (e.g., "I'd like to talk to customer service"), the speech generator 240 uses TTS to generate that utterance (e.g., varying the ways it can state that utterance). Now the dialog system 100 receives the utterance, attempts to recognize, and responds accordingly.

When the system 100 "hears" an utterance, it receives a large number of speech and dialog features. During training, the system 100 does not know which features are important yet—the system must learn that. After hearing the TTS generated speech, the system 100 can try out the action "I'll do that for you" using what the system 100 thinks is the most likely utterance to do that. After the system 100 picks its most likely guess (e.g., the topmost utterance in an n-best list), it checks that against the right answer, for example, received from the model trainer 230. Whether it is right or wrong, the system 100 learns what speech and dialog features are important for getting the answer right or wrong with the action that it took. All of this is learned with parametric models (e.g., a Bayesian network).

It is to be appreciated that the dialog system 100, the speech model 110, the dialog action model 120, the dialog system training environment 200, the user simulator 210, the language model 220, the model trainer 230 and/or the speech generator 240 can be computer components as that term is defined herein. Further, while the dialog action model 120 has been described as an influence diagram, those skilled in the art will recognize that any suitable model can be employed and all such models are intended to fall within the scope of the hereto appended claims.

Figure 4:
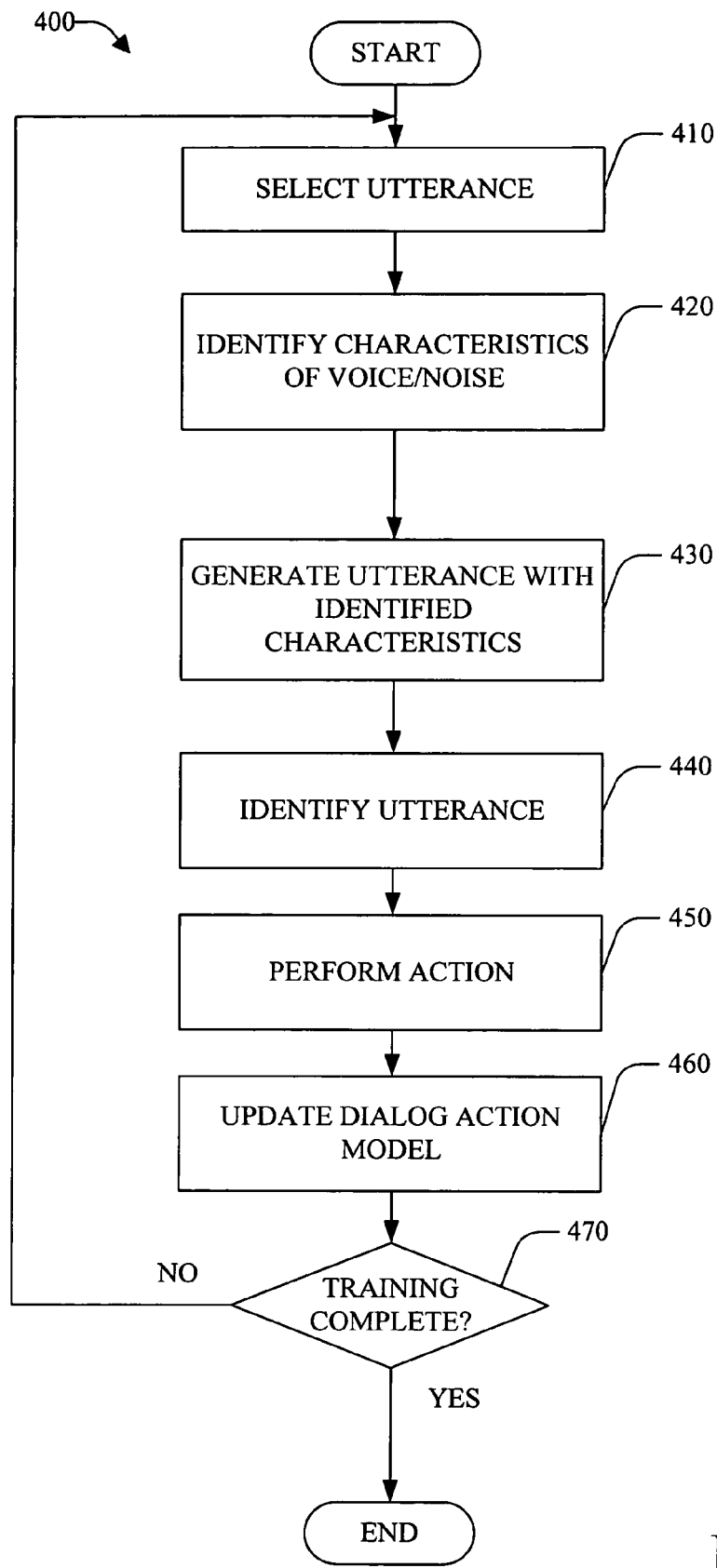
FIG. 4 is a flow chart of a method of training a learning system.
Figure 5:
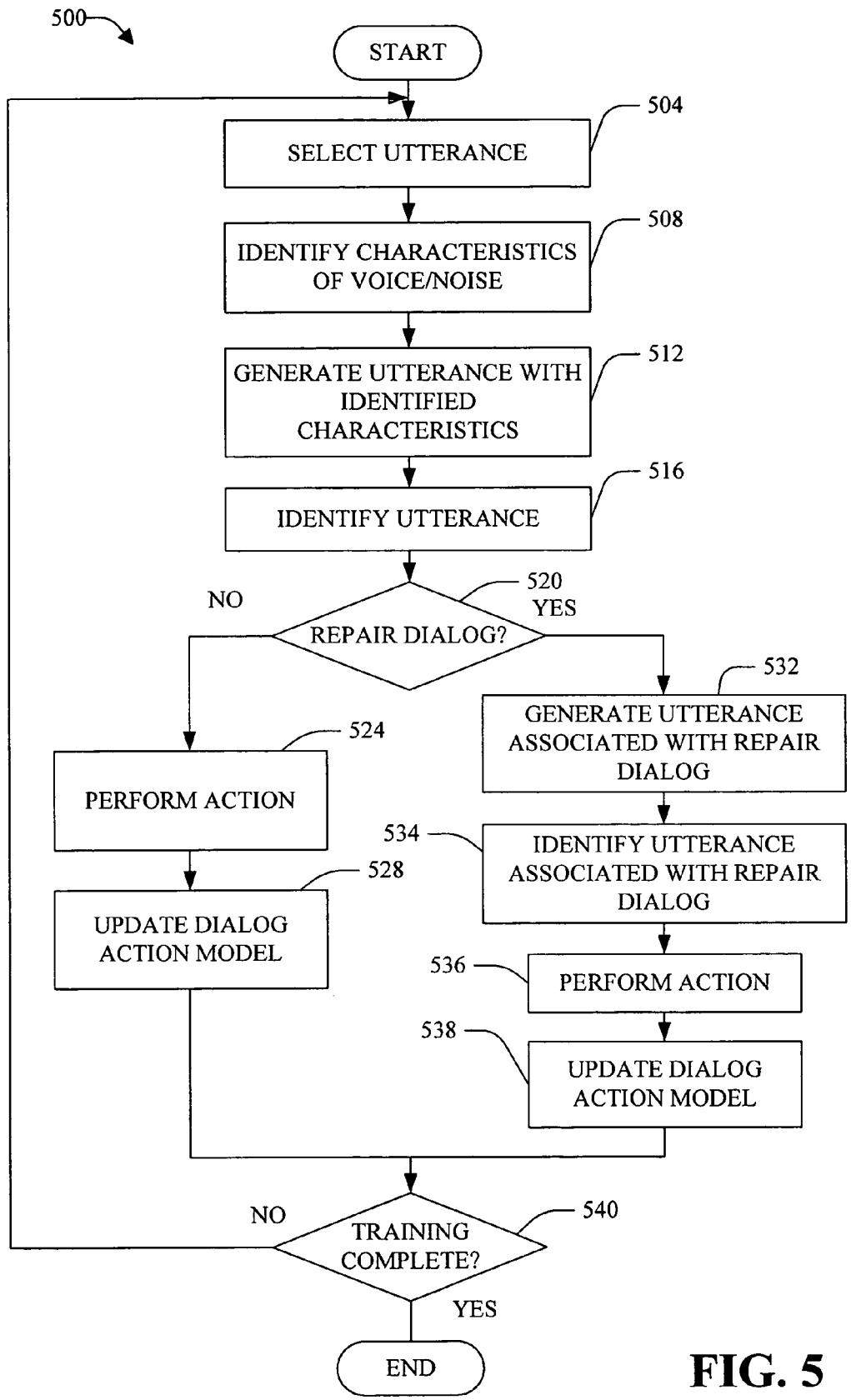
FIG. 5 is a flow chart of a method of training a learning system.

Turning briefly to FIGS. 4-5, methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Next, referring to FIG. 4, a method of training a learning system 400 is illustrated. At 410, an utterance is selected, for example, randomly by a model trainer 230 from a language model 220. At 420, characteristics of a voice and/or noise are identified. At 430, the utterance is generated with the identified characteristics, for example by a user simulator 210.

At 440, the utterance is identified (e.g., by a dialog system 100). At 450, an action is performed, for example, by a dialog action model 120. At 460, the dialog action model 120 is updated. At 470, a determination is made as to whether training is complete. If the decision is 470 is NO, processing continues at 410. If the decision at 470 is YES, no further processing occurs.

Turning next to FIG. 5, a method of training a learning system is illustrated. At 504, an utterance is selected, for example, randomly by a model trainer 230 from a language model 220. At 508, characteristics of a voice and/or noise are identified. At 512, the utterance is generated with the identified characteristics, for example by a user simulator 210.

At 516, the utterance is identified, for example, by a dialog system 100. At 520, a determination is made as to whether a repair dialog has been selected. If the determination at 520 is NO, at 524, an action is performed, for example, by a dialog action model 120. At 528, the repair dialog model is updated, and, processing continues at 540.

If the determination at 520 is YES, at 532, an utterance associated with the repair dialog is generated, for example, by the user simulator 210. At 534, an utterance associated with the repair dialog is identified (e.g., by the dialog system 100). At 536, an action is performed, for example, by a dialog action model 120. At 538, the dialog action model is updated.

At 540, a determination is made as to whether training is complete. If the determination at 540 is NO, processing continues at 504. If the determination at 540 is YES, no further processing occurs.

Those skilled in the art will recognize that while the methods of FIGS. 4 and 5 refer to a training environment, the dialog action model (e.g., dialog action model 120) and/or the speech model (e.g., speech model 110) can be modified over the data collected from the training phase even when the training phase has been completed.

Figure 6:
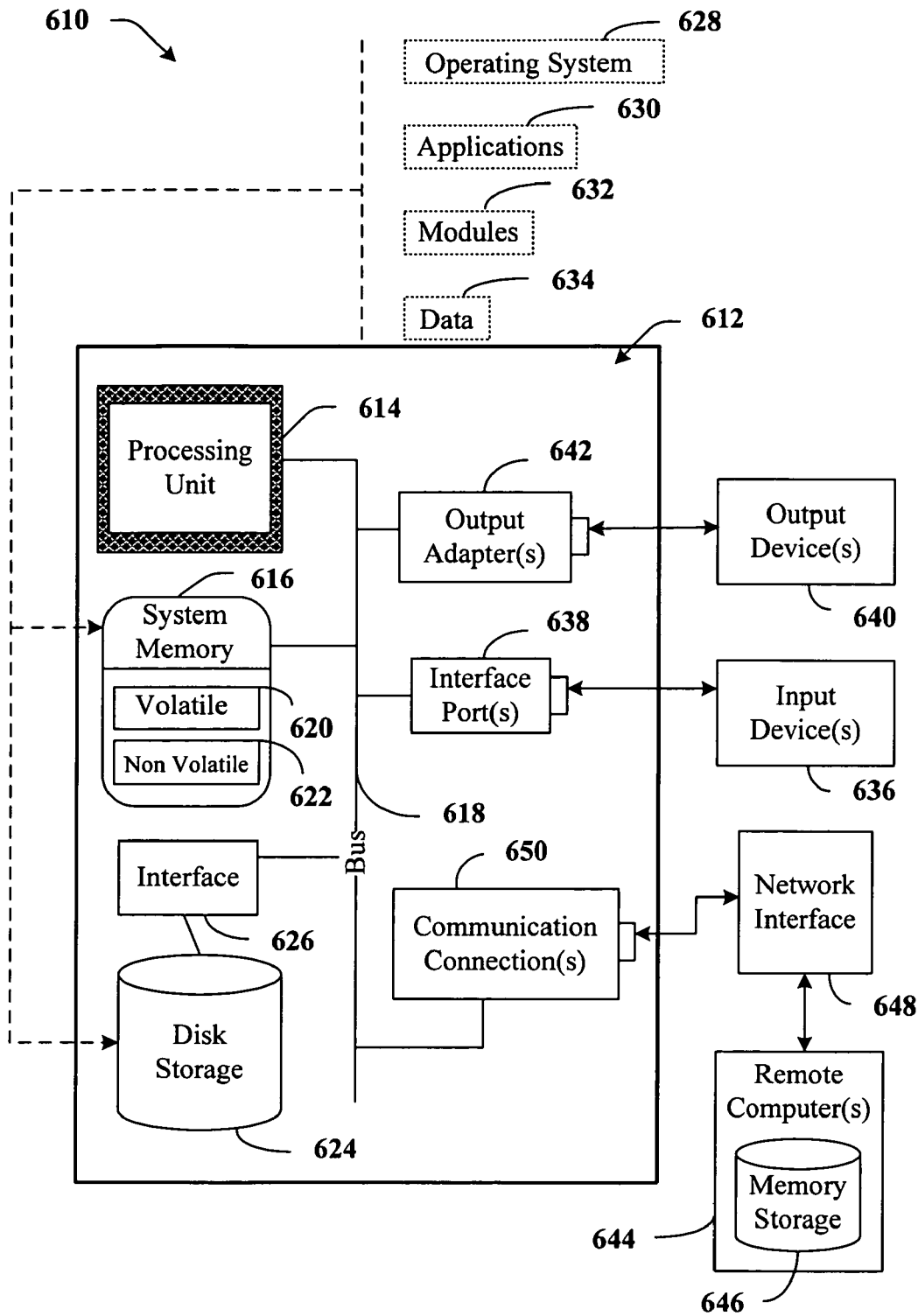
FIG. 6 illustrates an example operating environment.

In order to provide additional context for various aspects of the claimed subject matter, FIG. 6 and the following discussion are intended to provide a brief, general description of a suitable operating environment 610. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 610 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 6, an exemplary environment 610 includes a computer 612. The computer 612 includes a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include read only memory (ROM), programmable ROM (PROM), electrically programmable ROM (EPROM), electrically erasable ROM (EEPROM), or flash memory. Volatile memory 620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 612 also includes removable/nonremovable, volatile/nonvolatile computer storage media. FIG. 6 illustrates, for example a disk storage 624. Disk storage 624 includes, but is not limited to, devices like a magnetic disk drive, floppy disk drive, tape drive, Jaz drive, Zip drive, LS-100 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used such as interface 626.

It is to be appreciated that FIG. 6 describes software that acts as an intermediary between users and the basic computer resources described in suitable operating environment 610. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that the claimed subject matter can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612, and to output information from computer 612 to an output device 640. Output adapter 642 is provided to illustrate that there are some output devices 640 like monitors, speakers, and printers among other output devices 640 that require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems and DSL modems, ISDN adapters, and Ethernet cards.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented dialog system training environment, comprising:
   a processor to execute components of a dialog system;
   a memory coupled to the processor;
   a user simulator that during the dialog system training provides at least one text to speech training output associated with an utterance, the output having variable qualities; and
   a dialog system that comprises:
      a speech model having a plurality of modifiable speech model parameters, the speech model receives the at least one text to speech training output as a speech model input related to the utterance and produces related speech model output features;
      a dialog action model having a plurality of modifiable dialog action model parameters, the dialog action model receives the related speech model output features from the speech model and produces related output actions, the plurality of modifiable speech model parameters, the plurality of modifiable dialog action model parameters, or a combination thereof, are based, at least in part, upon the utterance, the action taken by the dialog action model, or a combination thereof; and
      the dialog system identifies the utterance that is in need of clarification by initiating a repair dialog, wherein the utterance associated with the repair dialog is identified includes:
         determining what states of the repair dialog are reached from other states, the dialog system learns which states to go to when observing an appropriate speech and dialog features by trying all repair paths using the user simulator where a user's voice is generated using various text-to-speech (TTS) engines at adjustable levels; and
         determining which states of the repair dialog are failures or successes.

2. The computer-implemented dialog system training environment of claim 1, wherein the dialog action model is modified with data collected from the training environment.

3. The computer-implemented dialog system training environment of claim 1, wherein the dialog action model further comprises a probability distribution associated with uncertainty regarding the plurality of modifiable dialog action model parameters.

4. The computer-implemented dialog system training environment of claim 1, wherein the user simulator further comprises adjusting at least one of a voice, a pitch, a rate or volume settings of the text to speech training output.

5. The computer-implemented dialog system training environment of claim 1, wherein the user simulator further comprises simulating a noisy environment.

6. The computer-implemented dialog system training environment of claim 1, wherein the user simulator further comprises a language model storing information associated with the utterance.

7. The computer-implemented dialog system training environment of claim 1, wherein the speech model is modified with data collected from the training environment.

8. A method of training a speech recognition learning system either offline or online, the method comprising:
   generating at least one text to speech output to an utterance using a user simulator during the training, the output having qualities comprising at least one of a voice, a pitch, a rate or a volume;
   identifying speech features related to the utterance using a speech model or using a dialog action model;
   identifying the utterance that is in need of clarification by initiating a repair dialog, wherein the utterance associated with the repair dialog is identified includes:
      determining what states of the repair dialog are reached from other states, the dialog system learns which states to go to when observing an appropriate speech and dialog features by trying all repair paths using the user simulator where a user's voice is generated using various text-to-speech (TTS) engines at adjustable levels; and determining which states of the repair dialog are failures or successes;

performing an action related to the speech features; and updating the dialog action model, the speech model or both, based at least in part on the speech features, the action, or a combination thereof.

9. The method of claim 8, wherein the qualities of the at least one text to speech output related to the utterance varies.

10. The method of claim 8, wherein the dialog action model further comprises a probability distribution associated with uncertainty regarding the dialog action model parameters or the speech model parameters.

11. The method of claim 8, wherein the user simulator further comprises simulating a noisy background.

12. The method of claim 8, wherein the user simulator further comprises a language model storing information associated with the utterance.

13. The method of claim 8, wherein the speech model is modified with data collected from the training.

14. A computer-implemented dialog training system, comprising:

a processing unit to implement the dialog training system;

a user simulator generating a simulated training data set for the dialog training system, the simulating training data set comprising text to speech training output associated with one or more simulated utterances varying over at least one of a pitch, a rate, a volume, a noise, or combinations thereof;

a speech model having a plurality of modifiable speech model parameters relating to the one or more simulated utterances, the speech model receiving the simulated training data set as a speech model input and producing related speech model output features relating to the one or more simulated utterances;

a dialog action model having a plurality of modifiable dialog action model parameters relating to the one or more simulated utterances, the dialog action model receiving the related speech model output features and producing corresponding output actions relating to the one or more simulated utterances; and the dialog training system further receives one or more simulated utterances that is in need of clarification by initiating a repair dialog, wherein the utterance associated with the repair dialog is identified includes:

determining what states of the repair dialog are reached from other states, the dialog system learns which states to go to when observing an appropriate speech and dialog features by trying all repair paths using the user simulator where a user's voice is generated using various text-to-speech (TTS) engines at adjustable levels; and determining which states of the repair dialog are failures or successes.

15. The computer-implemented dialog system of claim 14, wherein the dialog action model further comprises a probability distribution associated with uncertainty regarding the plurality of modifiable dialog action model parameters.

16. The computer-implemented dialog system of claim 14, wherein the user simulator further comprises simulating a noisy environment.

17. The computer-implemented dialog system of claim 14, wherein the user simulator further comprises a language model storing information associated with the one or more simulated utterances.

18. The computer-implemented dialog system of claim 14, wherein the speech model is modified with data collected from the training system.

* * * * *